(12) United States Patent
Lekutai (10) Patent No.: US 12,028,726 B2
(45) Date of Patent: Jul. 2, 2024

(54) NETWORK TESTING DETERMINATION

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 296 days.

(21) Appl. No.: 17/174,322

(22) Filed: Feb. 11, 2021

(65) Prior Publication Data

US 2022/0256371 A1    Aug. 11, 2022

(51) Int. Cl.
| | |
|---|---|
| H04W 24/08 | (2009.01) |
| H04B 17/345 | (2015.01) |
| H04L 43/0888 | (2022.01) |
| H04B 7/0452 | (2017.01) |
| H04W 84/04 | (2009.01) |

(52) U.S. Cl.
CPC .......... *H04W 24/08* (2013.01); *H04B 17/345* (2015.01); *H04L 43/0888* (2013.01); *H04B 7/0452* (2013.01); *H04W 84/042* (2013.01)

(58) Field of Classification Search
CPC .................................................... H04W 24/08
See application file for complete search history.

(56) References Cited

U.S. PATENT DOCUMENTS

| | | | | |
|---|---|---|---|---|
| 9,489,852 | B1* | 11/2016 | Chambers | B64C 39/024 |
| 10,703,476 | B2* | 7/2020 | Allard | B64C 39/024 |
| 11,174,045 | B2* | 11/2021 | Gil | B64U 30/20 |
| 11,217,106 | B2* | 1/2022 | Butler | G08G 5/0013 |
| 11,219,034 | B1* | 1/2022 | Dunsmore | H04W 72/542 |
| 11,447,245 | B2* | 9/2022 | Neubecker | B64C 39/02 |
| 11,495,132 | B2* | 11/2022 | Borgyos | G08G 5/0026 |
| 2015/0312774 | A1* | 10/2015 | Lau | G05D 1/102 |
| | | | | 455/446 |
| 2016/0244187 | A1* | 8/2016 | Byers | A47G 29/14 |
| 2018/0014162 | A1* | 1/2018 | Zavesky | H04W 4/40 |
| 2018/0192267 | A1* | 7/2018 | Zavesky | H04M 1/72409 |
| 2018/0199210 | A1* | 7/2018 | Zerick | H04W 24/04 |
| 2020/0143693 | A1* | 5/2020 | Chambers | G08G 5/003 |
| 2020/0160730 | A1* | 5/2020 | Priest | G08G 5/0069 |
| 2020/0288359 | A1* | 9/2020 | Kim | H04W 36/026 |
| 2020/0320802 | A1* | 10/2020 | Yang | B60W 50/04 |
| 2020/0361634 | A1* | 11/2020 | Gil | B64U 80/30 |
| 2021/0350714 | A1* | 11/2021 | Chambers | G08G 5/0034 |
| 2022/0101735 | A1* | 3/2022 | Malboubi | G08G 5/0026 |
| 2022/0225269 | A1* | 7/2022 | Lai | H04B 7/0452 |
| 2023/0205606 | A1* | 6/2023 | Palermo | G06F 9/5094 |
| | | | | 718/104 |
| 2023/0328704 | A1* | 10/2023 | Oh | H04L 5/0092 |
| | | | | 370/329 |

* cited by examiner

*Primary Examiner* — Guang W Li
(74) *Attorney, Agent, or Firm* — Lee & Hayes, P.C.

(57) ABSTRACT

A fifth generation (5G) network can provide testing capabilities by employing a test server to generate requests for testing at remote locations of the 5G network. The test server can be used to initiate tests, determine test conditions for conducting the tests, direct test locations, and receive test data from test tools remote from the server. The test server can initiate, establish, maintain, format, or otherwise determine tests that are usable to improve operation of the 5G network.

19 Claims, 6 Drawing Sheets

NETWORK TESTING DETERMINATION

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Test tools may be deployed to different locations in the environment to test the integrity or reliability of a telecommunication network. Test data gathered by the test tools can be used to design a network, mitigate interference, or otherwise improve network throughput. Some complex test scenarios, such as those associated with multiple user multi-input multi-output (MU-MIMO), Vehicle to Everything (V2X), and Unmanned Aerial Vehicle (UAV), can be time consuming due to the number of tests required and/or the complexity of gathering test data from multiple locations. In typical test systems, receiving test data from the test tools can be delayed while the test tools are deployed to various locations in the environment, or due to availability of a human to properly position the test tool, such as when a driver operates a vehicle comprising the test tool. Further, test data output by the test tools is often associated with a log file that requires further processing before being usable to assess or improve the network.

Techniques for testing quality of a 5G network are discussed herein. For instance, the testing techniques may include employing a computing device to generate a message for sending to test tools remote from the computing device. In such examples, the message may indicate a test location(s) and a test condition(s) (e.g., an upload test, a download test, a latency test, or a combination thereof), and so on. The computing device (e.g., a server) may also or instead send the message to a navigation device of a vehicle to cause the vehicle to navigate to the test location. In various examples, the computing device can receive test data from the test tools and use the test data to determine network parameters that maximize throughput to multiple user equipment (UEs) of the network. Using the testing techniques as described herein, a computing device can initiate, define, assign, or otherwise determine tests for test tools at multiple locations.

The testing techniques may include implementing a system to request, receive, and aggregate test data associated with specific locations within a network. For example, the system may employ a server configured to facilitate an exchange of data between user equipment (UE), test tools, and devices usable for navigation (e.g., a navigation component installed on a vehicle such as an autonomous vehicle or a UAV). In some examples, test data usable to determine network quality can be received by the server to ascertain network configurations that minimize interference and/or maximize throughput.

Generally, the testing techniques described herein enable deployment of remote test tools to physical locations determined by a server based at least in part on navigation information received from a navigation component of a vehicle. Additionally, the server can automate testing by coordinating drive tests, determining test locations, determining test conditions, receiving test data, associating metadata with the test data, and analyzing the test data to identify network parameters that improve network quality. By implementing the server to perform the testing techniques as described herein, test data can be received from multiple remote locations in less time versus testing techniques that rely on a driver to precisely locate a test tool in the environment for completion.

In some examples, the server can send test location information to a navigation component on a vehicle to cause navigation of the vehicle to the test location independent of input from a human (e.g., either to operate the test tool in the field, or to drive the test tool to the test location). Additionally, the server can process navigation data received from the navigation component to identify testing conditions (e.g., locations, signal strength, beam Precoding Matrix Indicator (PMI) number, frequency, power, Signal to Noise Ratio (SNR), etc.) that maximize peak aggregate throughput in multiple user multi-input multi-output (MU-MIMO), or other complex testing scenarios that depend on testing multiple conditions at multiple locations.

The systems and techniques disclosed herein may provide for receiving test data from test tools or devices usable to determine network parameters that improve network throughput to UEs or other devices communicating with the network. The test data may be used to design a network and/or mitigate interference in the network. In this way, test scenarios, such as those associated with multiple user multi-input multi-output (MU-MIMO), Vehicle to Everything (V2X), and Unmanned Aerial Vehicle (UAV), can be performed in less time versus approaches that do not utilize these systems and techniques.

In some examples, data communication can be established between the server and a Vehicle to Everything (V2X) device. In such examples, the server can identify whether the V2X device is a candidate for testing specific test locations (e.g., within a range of the test location, the V2X device is capable of reaching the test location, etc.) by receiving data from the V2X device indicating a current location of the device. In some examples, the server can communicate with a V2X device installed on the vehicle to communicate testing instructions and/or receive test data. For instance, navigation data or network data from the V2X device can be used to initiate a test or identify types of testing to be performed. By processing navigation data and/or network data from multiple V2X devices, the server can determine that an upload test, latency test, or other test should be performed at locations associated with one or more of the multiple V2X devices.

Figure 1:
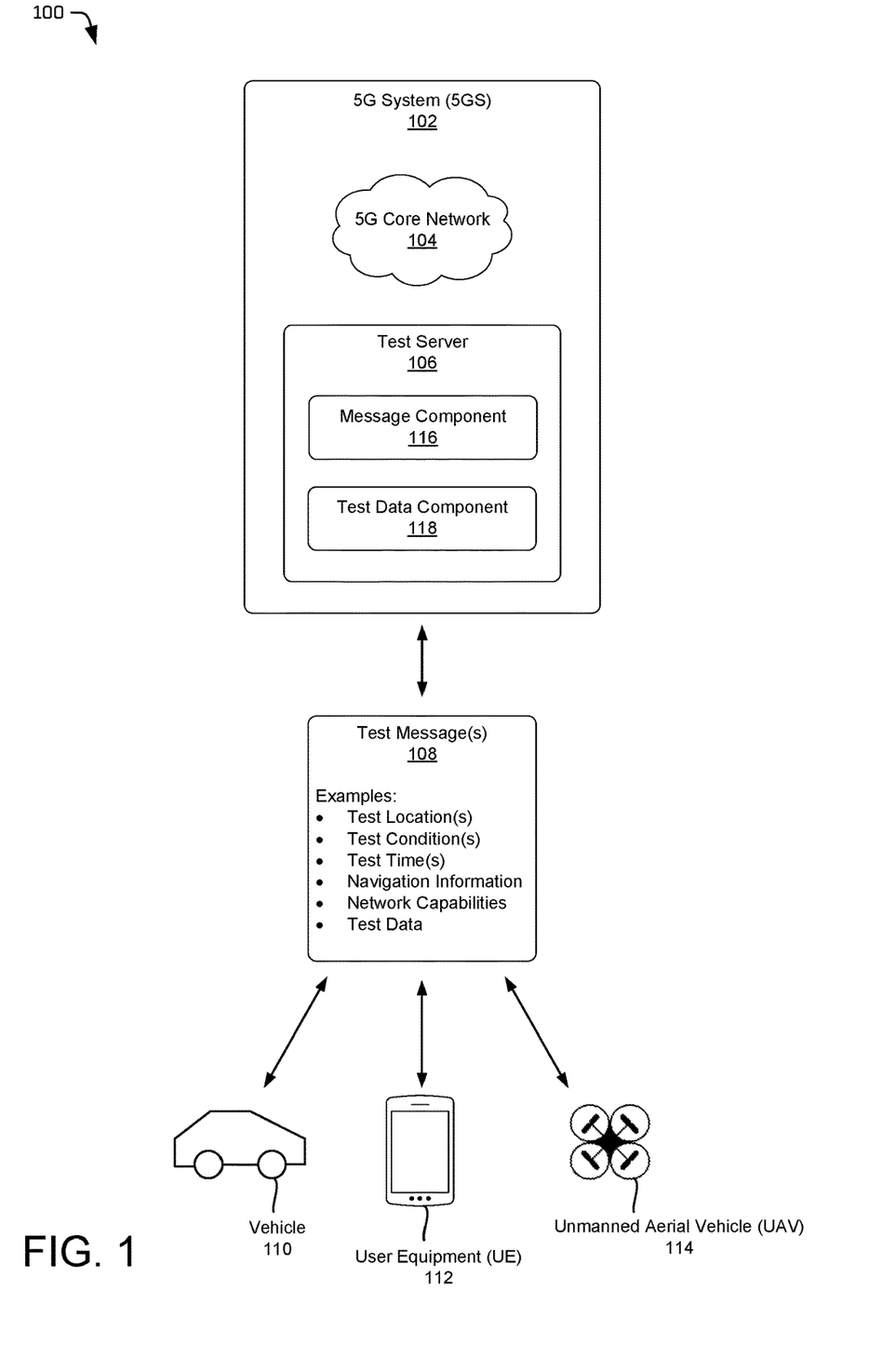
FIG. 1 depicts an example network environment in which example devices can connect to a telecommunication network to implement the testing techniques described herein.

FIG. 1 depicts an example network environment 100 in which example devices can connect to a telecommunication network to implement the testing techniques described herein. As depicted in FIG. 1, a 5G system 102 comprises a 5G core network 104 and a test server 106 that is configured to generate a test message(s) 108 for communication with one or more of: a vehicle 110, a UE 112, or a UAV 114. As shown in FIG. 1, the test server 106 comprises a message component 116 to format, configure, or otherwise generate the test message(s) 108 for sending over the 5G core network 104. In various examples, and as explained in more detail below, test data is captured at different test locations in accordance with test conditions determined by the test server 106. The test server 106 also comprises a test data component 118 to process the test data and determine parameters that improve overall performance (e.g., reduce interference and maximize throughput) of the 5G core network 104. By implementing the test server 106, test data can be received and processed in less time versus approaches that lack the test server 106, enabling network improvements to be designed into new or existing networks.

Generally, any of the vehicle 110, the UE 112, or the UAV 114 can send and receive test message(s) 108 via a test tool included in or coupled to the vehicle 110, the UE 112, or the UAV 114. The test tool can represent hardware and/or software that is configured to receive a request for testing from the test server 106, initiate a test at the test location, and send test data associated with the test to the test server 106 via the 5G core network 104. For instance, a test tool (also referred to as a "test module") may represent hardware in the vehicle 110 that captures network data associated with multiple UEs and one or more base stations in a vicinity of the test location. In some examples, the test tool may comprise an application in the UE 112 that causes a test to be performed at a test location based on the test message 108 from the test server 106. The test tool may also or instead determine a capability of the network at the test location based on the network data received by the test tools during testing. Further description of test tools is found throughout this disclosure.

The vehicle 110 can comprise a vehicle that requires a driver for navigation, a semi-autonomous vehicle, or an autonomous vehicle that does not require a driver for navigation, and includes a device to wirelessly connect to the 5G core network 104. The vehicle 110 may include a navigation component (e.g., hardware and/or software to navigate the vehicle to a location) in communication with the test server 106 via the 5G core network 104. The test server 106 may also or instead receive navigation data from the navigation component included in the vehicle 110, the UE 112, or the UAV 114 to consider current locations of the vehicle 110, the UE 112, or the UAV 114 when assigning testing locations to different test tools.

The UE 112 represents any device that can wirelessly connect to the 5G core network 104, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 112 is illustrated in greater detail in FIG. 6.

The UAV 114 represents a device included in an unmanned aerial vehicle that can wirelessly connect to the 5G core network 104. In some examples, one or more UAVs can cause potential interference between a base station and one or more UEs. To mitigate the potential interference, the test server 106 can initiate tests to determine which frequencies or channels that the base station should use to provide service to both the UE's and the UAVs. Based on test data from the tests, the test server 106 can determine network parameters that reduce or eliminate the potential interference. The test server 106 can, for instance, cause the UAVs to navigate to various test locations, receive test data from each UAV, and cause the base station to change a frequency partition allocation to the UEs and/or the UAVs to mitigate the potential for interference between the base station and at least one of the UEs or at least one of the UAVs. In some examples, the test server 106 can preemptively eliminate the potential interference by communicating the network parameters to a computing device responsible for changing network parameters of the base station.

As mentioned above, the message component 116 can format, configure, or otherwise generate the test message(s) 108 for sending over the 5G core network 104. For instance, the message component 116 can determine test location(s) and test condition(s) for tests to be conducted by one or more test tools. In various examples, the message component 116 determines the test locations based at least in part on navigation data received from various devices by the test server 106. In some examples, the test conditions can indicate to perform at least one of: an upload test, a download test, a combined upload and download test, a latency test, a jitter test, a packet rate test, a voice quality test, a video quality test, a backhaul test, a handover test, etc. In some examples, the test conditions can be associated with testing at least one of: a Time Division Duplex (TDD) system, a Frequency Division Duplex (FDD) system, an Unmanned Aerial Vehicle (UAV) system, a Vehicle to Everything (V2X) system, or a multiple user multi-input multi-output (MU-MIMO) system.

In various examples, the test data component 118 of the test server 106 can process the test data received from the vehicle 110, the UE 112, and/or the UAV 114 to improve performance of the 5G core network 104. For example, the test data component 118 can determine and/or associate metadata with the test data to indicate a test time when the test data was captured. Generally, the test data can indicate one or more capabilities of the network such as one or more of: downlink and uplink throughputs, latency, volume of data, time/location, amount of call attempts, accepts, failures, amount of handovers, mean-opinion-score (MOS), signal to interference plus noise ratio (SINR), modulation and coding scheme (MCS), signal strength, UE transmit power, cell site number, or a frequency. In various examples, the metadata can indicate the one or more capabilities of the network indicated by the test data. In some examples the test data component 118 can initiate storing the test data and the metadata in a database (or other memory), and optionally access the test data from the database, based at least in part on the metadata.

The test data component 118 can, in some examples, compare test data associated with different times and/or different locations and/or different beam patterns, and/or different software load and/or different sequential orders/timing and/or quality of service (SLA) to identify network parameters that, if implemented, causes the 5G network 104 to operate at peak throughput (e.g., upload throughput, download throughput, or a combination thereof) for future communications with UEs. Example network parameters can include, but are not limited to: a location, a signal strength, a beam Precoding Matrix Indicator (PMI) number, a frequency, a power, or a signal-to-noise ratio to transmit data between the one or more UEs and the 5G core network 104.

In various examples, the 5G system 104 can represent functionality to provide communications between the test server 106 and the vehicle 110, the UE 112, and/or the UAV 114, and can include one or more radio access networks (RANs), as well as one or more core networks linked to the RANs. For instance, a UE 112 can wirelessly connect to a base station or other access point of a RAN, and in turn be connected to the 5G core network 104. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi® technology, and/or any other previous or future generation of radio access technology. In this way, the 5G system 102 is compatible to operate with other radio technologies including those of other service providers. Accordingly, the test message(s) 108 can reach the UE 112 (or the vehicle 110 or UAV 114) in examples when the UE 112 is associated with another service provider (e.g., a third-party) independent of the technology or core network associated with the service provider.

In some examples, the 5G core network 104 can represent a service-based architecture that includes multiple types of network functions that process control plane data and/or user plane data to implement communications for the vehicle 110, the UE 112, and/or the UAV 114. The network functions of the 5G core network 104 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

Figure 2:
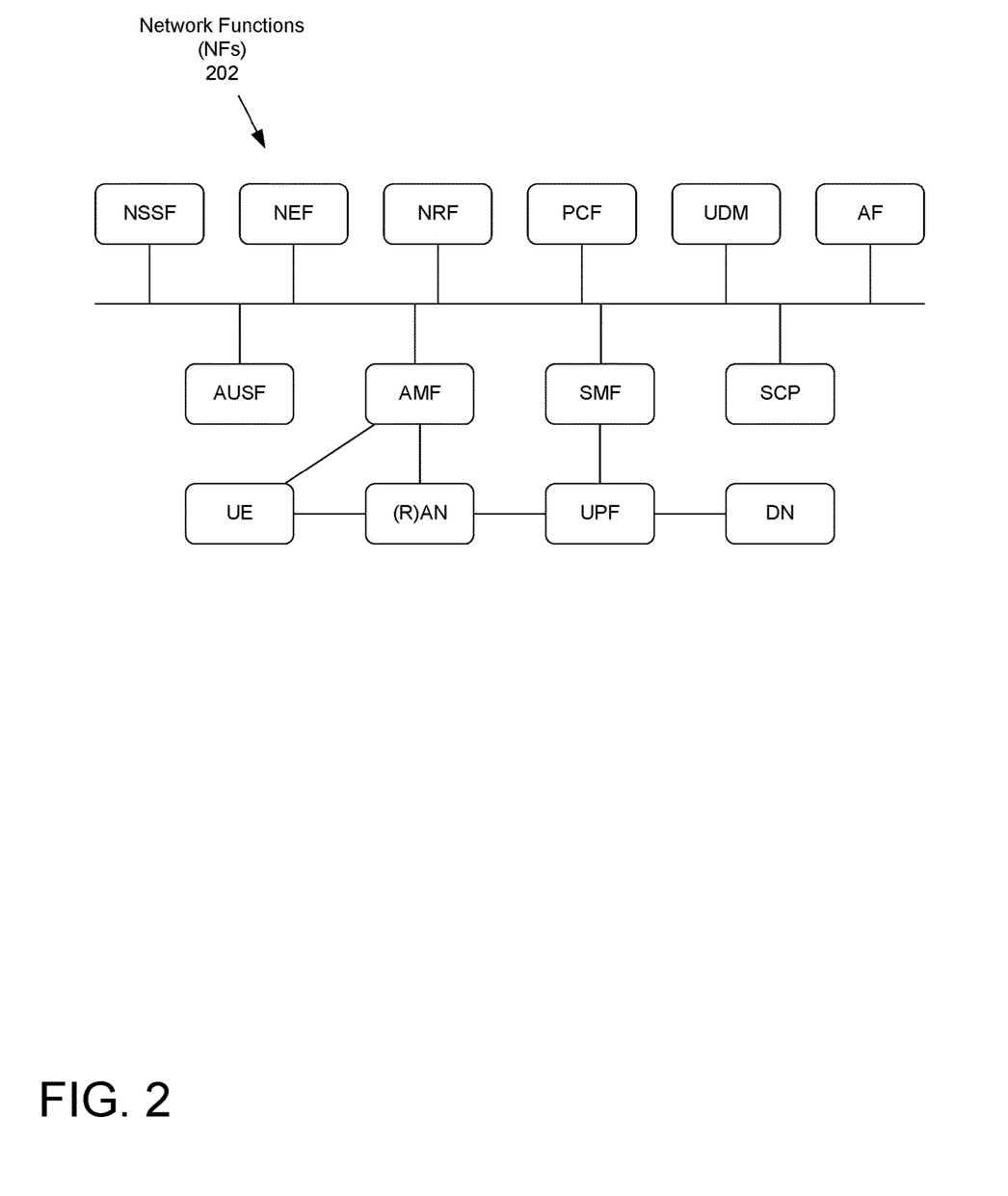
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 104 in FIG. 1 that includes a service-based system architecture in which different types of network functions (NFs) 202 operate alone and/or together to implement network services. Standards for 5G communications define many types of NFs 202 that can be present in 5G telecommunication networks (e.g., the 5G core network 104), including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G core network 104 can be implemented as network applications that execute within containers (not shown). 5G NFs 202 can execute as hardware elements, software elements, and/or combinations of the two within telecommunication network(s), and accordingly many types of 5G NFs 202 can be implemented as software and/or as virtualized functions that execute on cloud servers or other computing devices. Network applications that can execute within containers can also include any other type of network function, application, entity, module, element, or node.

Figure 3:
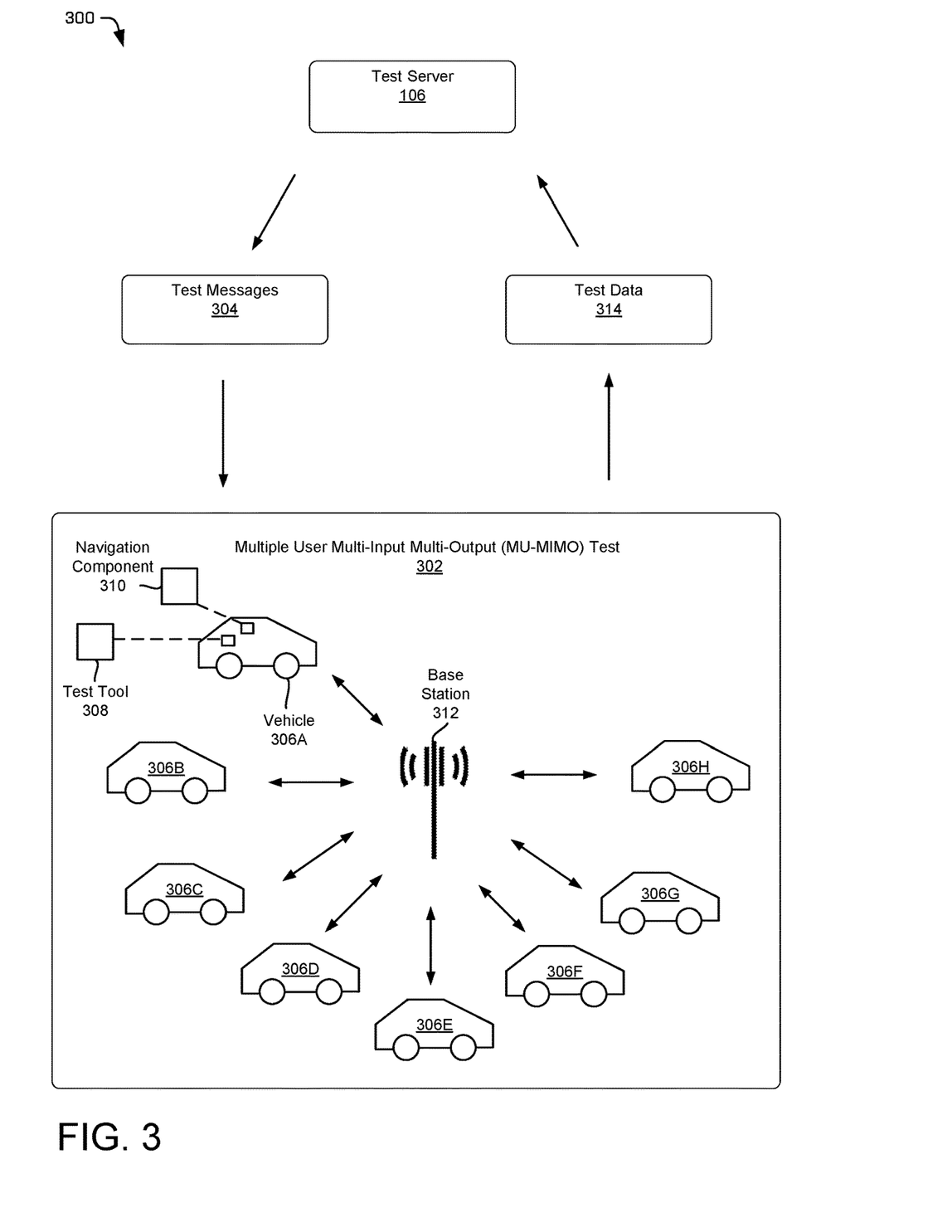
FIG. 3 depicts another example network environment in which an example test tool can connect to a telecommunication network to implement the techniques described herein.

FIG. 3 depicts another example network environment 300 in which example devices can connect to a telecommunication network to implement the testing techniques described herein. For instance, the test server 106 in FIG. 1 can perform a multiple user multi-input multi-output (MU-MIMO) test 302 using the 5G system 102.

In various examples, the test server 106 can generate test messages 304 to indicate test conditions for test locations associated with each of vehicle 306A, vehicle 306B, vehicle 306C, vehicle 306D vehicle 306E vehicle 306F vehicle 306G, and vehicle 306H (referred to collectively as the "vehicles"). In some examples, the test server 106 can configure a test message 304 for each of the vehicles to indicate a test type to perform (e.g., upload test, download test, latency test, a voice quality test, a video quality test, etc.).

FIG. 3 illustrates that the vehicle 306A comprises a test tool 308 and/or a navigation component 310 capable of communicating (e.g., sending and/or receiving) data with the test server 106 using the 5G core network 104. For ease of explanation, test tools and navigation components of the other vehicles are not shown. However, it is to be understood that each of the vehicles comprises a respective test tool and navigation component that may each independently connect to the 5G core network 104. Moreover, though eight vehicles are shown in FIG. 3 to perform the MU-MIMO test 302, any number of vehicles can be deployed to conduct tests associated with additional locations and/or additional users. In some examples, tests performed by each of the test tools may be conducted at each test location approximately simultaneously to identify changes in operation of the 5G core network 104.

As shown in FIG. 3, the test server 106 can send the test message 304 to the test tool and/or the navigation component of each respective vehicle (e.g., vehicle 306A, vehicle 306B, etc.). In some examples, the test server 106 can send the test messages 304 based at least in part on receiving an indication to test the network. For instance, the test server 106 may receive network data from a remote sensor (e.g., a sensor located in an environment separate from the test server 106 such as a traffic sensor, a vehicle sensor, and so on), and configure the test messages 304 based at least in part on the network data from the remote sensor meeting or exceeding a testing threshold. Additionally or alternatively, the test server 106 can configure the test messages 106 based at least in part on an occurrence of one or more events (e.g., a drop call rate, a change in noise, or a pre-determined throughput value).

Generally, the test tool 308 represents hardware and/or software that is configured to receive a request for testing (e.g., the test messages 304) from the test server 106, initiate a test at the test location, and send test data (e.g., test data 314) associated with the test to the test server 106 via the 5G core network 104. By way of example and not limitation, the test tool 308 can represent a computing device that is configured to analyze, filter, compress, or otherwise process network data gathered by the test tool 308 during test time. In some examples, the processed network data can be sent from each test tool as the test data 314 while in other examples the test data 314 can represent unprocessed network data.

In some examples, the navigation component 310 (e.g., hardware and/or software to navigate the vehicle to a location) can receive test location information associated with the test message 304 (either directly over the 5G core network 104 or from the test tool 308 in examples that the test tool communicates with the navigation component 310). By sending the test location to the navigation component 310, the test server 106 can cause the vehicles to navigate to the respective test locations (e.g., to within a few meters of the test location). Based at least in part on the vehicles navigating to the test locations, the test server 106 can receive test data from the test tools associated with the vehicles that indicate one or more capabilities of the network specific for each of the test locations. In some examples, the navigation component can comprise a V2X device.

Generally, the test tool 308 can implement functionality to receive network data associated with communications between one or more UEs, the vehicle 306A, the navigation component 310, and/or the base station 312. For instance, the test tool 308 can determine test data 314 that indicates one or more capabilities of the 5G core network 104 including one or more of: downlink and uplink throughputs, latency, volume of data, time/location, amount of call attempts, accepts, failures, amount of handovers, mean-opinion-score (MOS), signal to interference plus noise ratio (SINR), modulation and coding scheme (MCS), UE transmit power, signal strength, cell site number, or a frequency.

In various examples, the test server 106 can receive the test data 314 from each respective test tool associated with each of the vehicles, and associate metadata such as an upload time, a test time, or other details about the test data including the network capabilities associated with the network. Further, the test server 106 can store the test data and associated metadata in a database or other memory which enables collective test data received over time to be searched and/or accessed based on user-specified test type, network parameters, and the like (e.g., such as via a user interface on a display device).

The test server 106 can process the test data 314 in various ways to determine network parameters that provide peak throughput (upload and/or download throughput) for the one or more UEs accessing the 5G core network 104. For example, the test server 106 can analyze test data associated with different test times to identify similarities and/or differences among the test data of similarly configured networks. In some examples, the network parameters determined by the test server 106 to provide peak throughput can include one or more of: a bandwidth, a Time Division Duplex (TDD) ratio configuration, a frequency, a transmission power, or a beamforming Precoding Matrix Indicator (PMI), a location, a signal strength, or a signal-to-noise ratio. In various examples, the network parameters are usable to transmit data between the one or more UEs and the network with optimal efficiency and accuracy.

Although FIG. 3 describes an example MU-MIMO test 302, the techniques described herein can also apply to a Time Division Duplex (TDD) system, a Frequency Division Duplex (FDD) system, an Unmanned Aerial Vehicle (UAV) system, or a Vehicle to Everything (V2X) system, just to name a few. For example, the test tool 308 can be included in multiple UAVs to receive network data and identify, based on the network data, interference between at least one of the UAVs and the base station 312. In such examples, the test server 106, based at least in part on identifying the interference, can initiate an action to reduce the interference including one or more of: mitigating interference between the at least one UAV and the base station; mitigating noise rise associated with the one or more UEs and the base station, or causing at least one of the UAVs and/or UEs to be inoperable. Reducing interference by the test server 106 can also or instead include 1) sending an instruction to the base station 312 that causes a change in frequencies allocated to at least one of the UEs and/or at least one of the UAVs (e.g., change an amount of bandwidth available to the UAVs versus the UEs and vice versa) and/or 2) sending an instruction to the UEs and/or UAVs that causes a change in transmit power to at least one of the UEs and/or at least one of the UAVs (e.g., reduce the transmit power).

Figure 4:
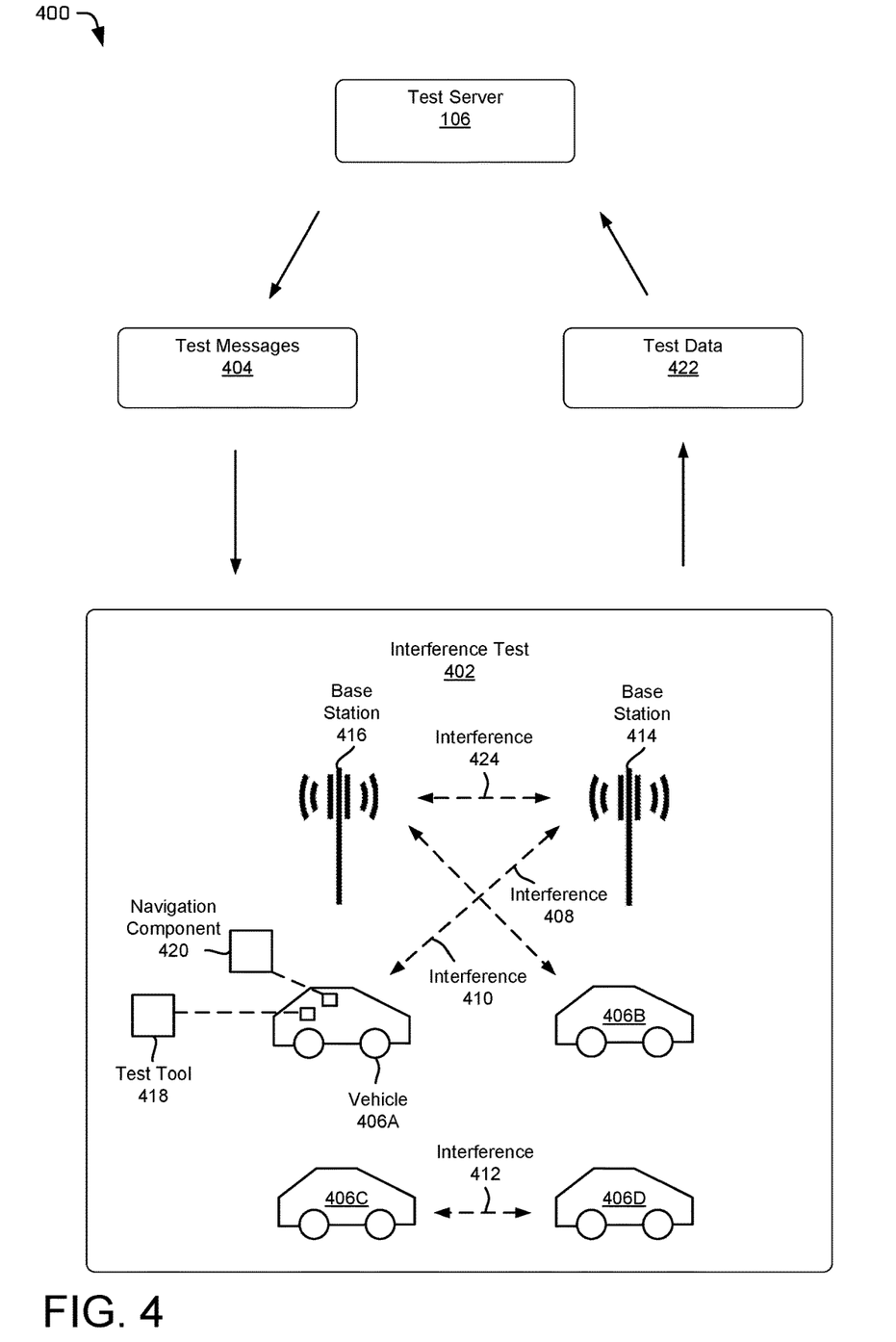
FIG. 4 depicts another example network environment in which an example test tool can connect to a telecommunication network to implement the techniques described herein.

FIG. 4 depicts another example network environment 400 in which example devices can connect to a telecommunication network to implement the testing techniques described herein. In some examples, the test server 106 in FIG. 1 can perform an interference test 402 using the 5G system 102.

As shown in FIG. 4, the test server 106 can send test messages 404 indicating test conditions for test locations associated with each of vehicle 406A, vehicle 406B, vehicle 406C, and vehicle 406D (referred to collectively as the "vehicles"). In some examples, the test server 106 can configure the test messages 404 for each of the vehicles to request an interference test associated with interference 408, interference 410, and/or interference 412. For instance, test data previously received by the test server 106 may indicate presence of interference 408 between a UE presently or previously located in a vicinity of the vehicle 406A and base station 414, interference 410 between a UE presently or previously located in a vicinity of the vehicle 406B and base station 416, or interference 412 between a UE associated with a current location of vehicle 406C and a UE associated with a current location of the vehicle 406D. In some examples, the test server 106 can configure and/or send the test messages 404 for each of the vehicles based at least in part on detecting the interference 408, the interference 410, and/or the interference 412.

Each of the vehicles comprise a test tool 418 and/or a navigation component 420 capable of communicating (e.g., send and/or receive) data with the test server 106 using the 5G core network 104. Though four vehicles are shown in FIG. 4 to perform the interference test 402, any number of vehicles can be deployed to conduct tests from additional locations. In some examples, the tests are conducted at each test location approximately simultaneously to identify changes in operation of the 5G core network 104. In various examples, the tests can be conducted in response to sending test locations to the navigation components 420 that cause the vehicles to navigate to the test locations.

In some examples, test data 422 from the test tools 418 is received by the test server 106 for processing. For instance, the test server can employ the test data component 118 to determine a testing threshold representing a level of performance of the network to trigger a test by the test server 106. In some examples, the test messages 404 can direct testing separation between two base stations, and the test data 422 can comprise distance data between the base station 414 and the base station 416. In such examples, the test server 106 can reduce the interference 408, the interference 410, the interference 412 and/or the interference 424 at a later time by determining a horizontal distance or a vertical distance to relocate one or more of the base station 414 and/or the base station 416. In some examples, the test messages 404 can direct center frequency separation between the base station 414 and the base station 416. In such examples, the test server 106 can mitigate the interference 408, 410, 412 and 424 at a later time by determining a guard band between the base stations 414 and 416.

In examples when the interference test 402 is performed in a Time Division Duplex (TDD) system, the test server 106 can utilize the test data 422 to determine a Time Division Duplex (TDD) ratio configuration that enables a first operator and a second operator to communicate simultaneously in the TDD system.

Figure 5:
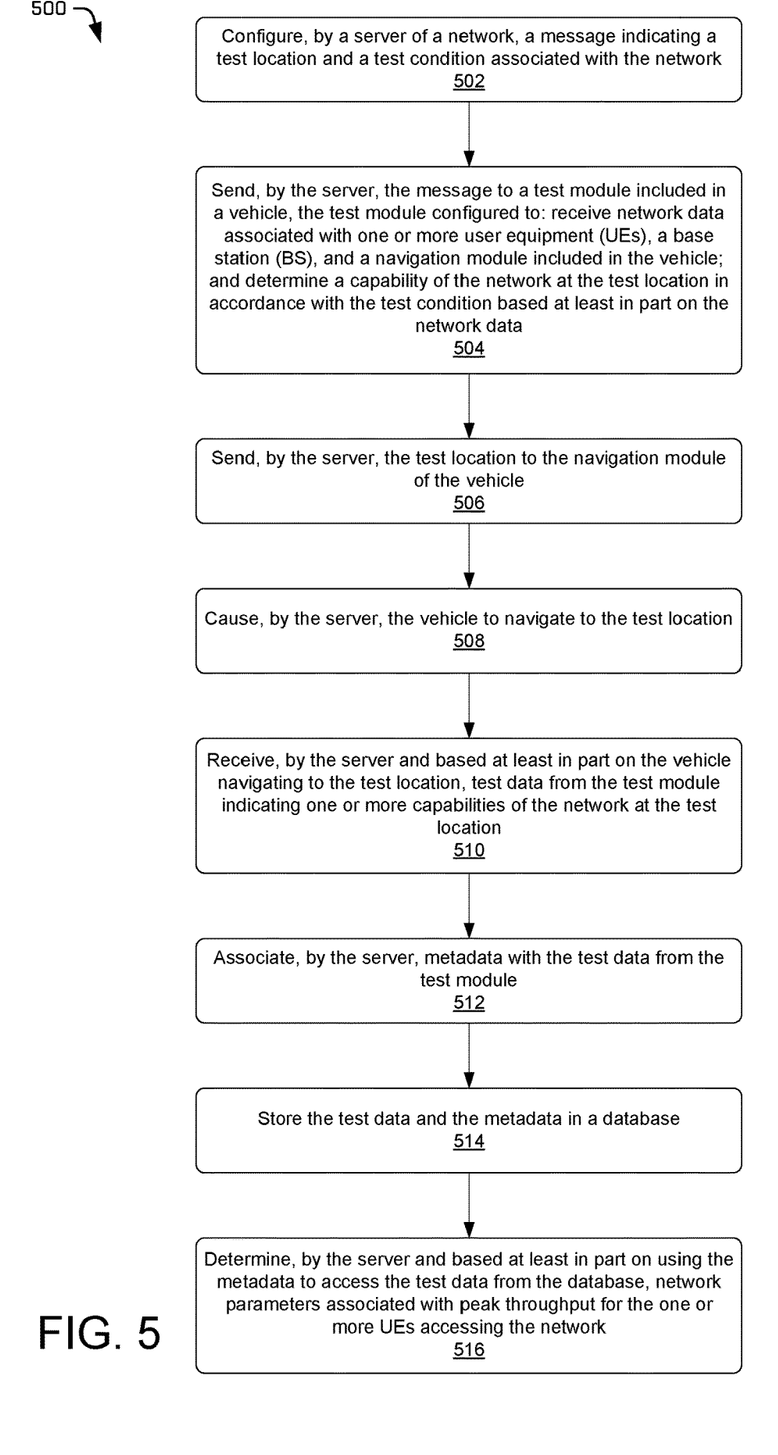
FIG. 5 depicts a flowchart of an example process for testing a network using an example server to receive test data from remote test tools.

FIG. 5 depicts a flowchart of an example process 500 for testing a network using an example server to receive test data from remote test tools. Some or all of the process 500 may be performed by one or more components, tool, or modules in FIGS. 1-4, as described herein. For example, some or all of process 500 may be performed by the test server 106.

At operation 502, the process may include configuring, by a server of a network, a message indicating a test location and a test condition associated with the network. By way of example and not limitation, a UE of a fifth generation system that includes a fifth generation core network can send a message comprising a request to perform an upload test, a latency, test, an interference test, or other test type. In some examples, the operation 502 may include the test server 106 generating test messages to coordinate multiple test locations and multiple test conditions in a Time Division Duplex (TDD) system, a Frequency Division Duplex (FDD) system, an Unmanned Aerial Vehicle (UAV) system, a Vehicle to Everything (V2X) system, or a multiple user multi-input multi-output (MU-MIMO) system.

In some examples, the operation 502 may include the test server 106 identifying a sequence of remote tests to be performed at multiple test locations, and sending a first message to a first navigation component included in a first vehicle indicating a first portion of the sequence of remote tests to perform at a first test location of multiple test locations. The test server 106 may also or instead send a second message to a second navigation component different from the first navigation component included in a second vehicle indicating a second portion of the sequence of remote tests to perform at a second test location of multiple test locations. Accordingly, the test server 106 can cause the first vehicle to navigate to the first test location and cause the second vehicle to navigate to the second test location in accordance with the ranking.

At operation 504, the process may include sending, by the server, the message to a test module included in a vehicle. In some examples, the operation 504 may include the test server 106 communicating with the test module (e.g., the test tool(s) 308 and/or the test tool(s) 418) that is configured to receive network data associated with one or more user equipment (UEs), a base station (BS), and a navigation component included in the vehicle, and determine a capability of the network at the test location in accordance with the test condition based at least in part on the network data.

At operation 506, the process may include sending, by the server, the test location to the navigation component of the vehicle. In some examples, the operation 506 may include the test server 106 sending the test messages 304 to the navigation component 310 or the test messages 404 to the navigation component 420.

At operation 508, the process may include causing, by the server, the vehicle to navigate to the test location. In some examples, the operation 508 may include the test server 106 configuring the test messages 304 to include test location information (e.g., coordinates, etc.) that enables the navigation component 310 to navigate the vehicle, such as the vehicle 306A. In examples when the vehicle 306A includes a driver, the navigation component 310 can output the testing location to cause the driver to reach the test location. In examples when the vehicle is an autonomous vehicle, the navigation component 310 can cause the vehicle to reach the test location without intervention from a driver based on the test message. In some examples, the test server 106 can direct multiple vehicles to test locations using current locations of the vehicles to determine a closest vehicle having a test tool to conduct testing based on the test messages 304.

In some examples, the operation 508 may include the test server 106 sending an indication of a ranking to the navigation component to cause the vehicle to navigate to a first location and a second location in accordance with the ranking. For examples, the test server 106 can identify multiple tests to be performed at multiple locations, and rank an order for one or more vehicles to navigate to the multiple locations. In this way, the test server 106 can effectively deploy test tools associated with vehicles to the multiple locations.

At operation 510, the process may include receiving, by the server and based at least in part on the vehicle navigating to the test location, test data from the test module indicating one or more capabilities of the network at the test location. In some examples, the operation 510 may include the test server 106 receiving the test data 314 or the test data 422 from test tools associated with respective vehicles. In various examples, the one or more capabilities of the network indicated by the test data can comprise one or more of: downlink and uplink throughputs, latency, volume of data, time/location, amount of call attempts, accepts, failures, amount of handovers, mean-opinion-score (MOS), signal to interference plus noise ratio (SINR), modulation and coding scheme (MCS), UE transmit power, signal strength, cell site number, or a frequency.

At operation 512, the process may include associating, by the server, metadata with the test data from the test module. In some examples, the operation 512 may include the test server 106 appending a test time or other information associated with the test data usable for organizing the test data in storage and/or for accessing at a later time.

At operation 514, the process may include storing the test data and the metadata in a database. In some examples, the operation 514 may include the test server 106 storing the test data and the metadata in storage (e.g., a database, a memory, and so on). The metadata can, in some examples, enable test data from different time to be accessed easily by test times, network features, and the like.

At operation 516, the process may include determining, by the server and based at least in part on using the metadata to access the test data from the database, network parameters associated with peak throughput for the one or more UEs accessing the network. In some examples, the operation 516 may include the test server 106 processing the test data 314 and/or the test data 422 to determine network parameters that optimize operation of the network. In various examples, the network parameters can include a location, a signal strength, a beam Precoding Matrix Indicator (PMI) number, a frequency, a power, or a signal-to-noise ratio associated with a UE and/or a base station associated with the network. In various examples, the network parameters determined by the test server 106 can be used to improve service to the one or more UEs accessing the network (relative to not implementing the test server 106, for example).

Figure 6:
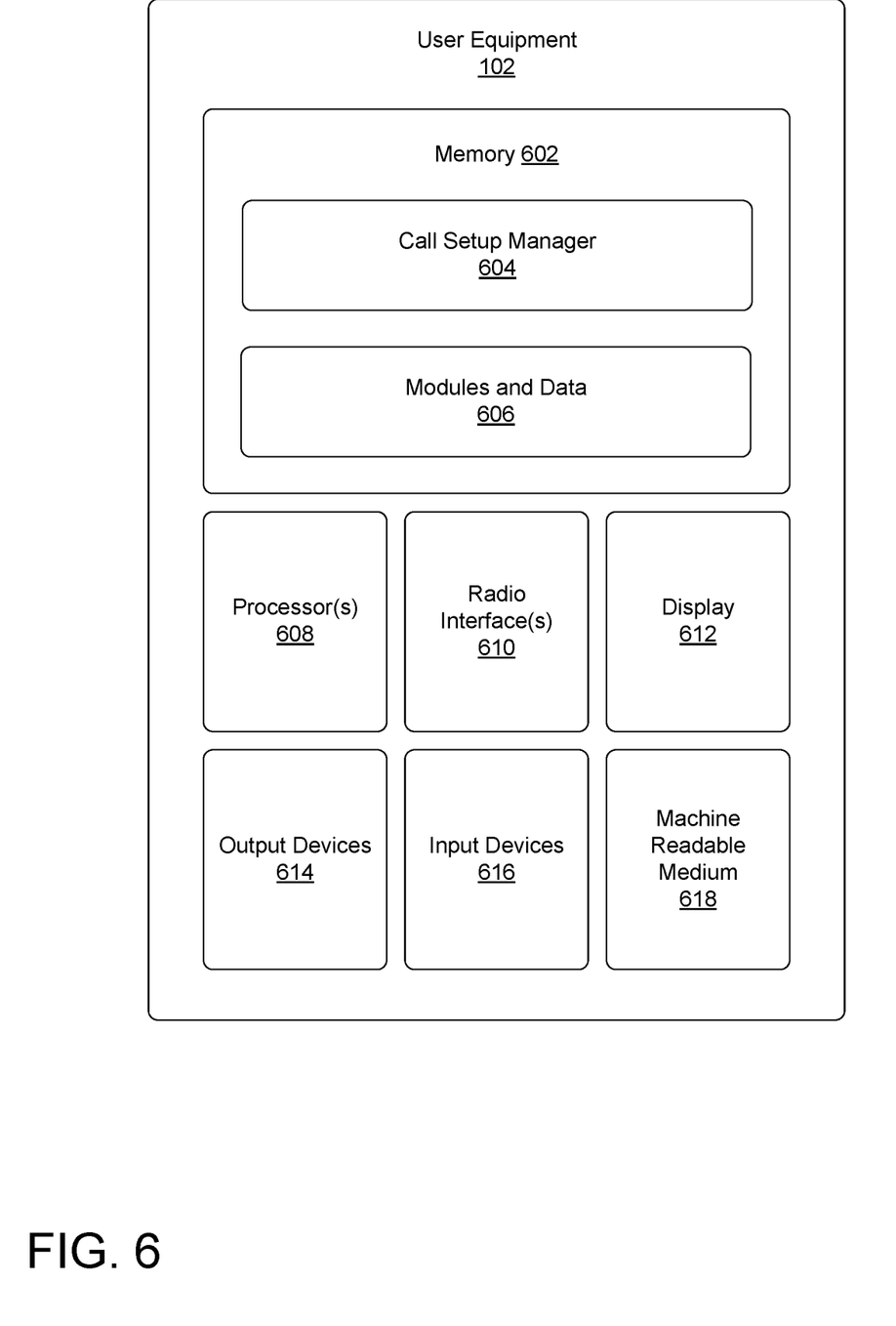
FIG. 6 depicts an example system architecture for a user equipment.

FIG. 6 depicts an example system architecture for a UE 112, in accordance with various examples. As shown, a UE 112 can have memory 602 storing a call setup manager 604, and other modules and data 606. A UE 112 can also comprise processor(s) 608, radio interfaces 610, a display 612, output devices 614, input devices 616, and/or a machine readable medium 618.

In various examples, the memory 602 can include system memory, which may be volatile (such as RAM), non-volatile (such as ROM, flash memory, etc.) or some combination of the two. The memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 112. Any such non-transitory computer-readable media may be part of the UE 112.

The call setup manager 604 can send and/or receive messages comprising RCS service including SIP messages associated with setup and management of a call session via the IMS 306. The SIP messages can include any of the SIP messages shown in FIG. 5, and/or other SIP messages.

The other modules and data 606 can be utilized by the UE 112 to perform or enable performing any action taken by the UE 112. The modules and data 606 can include a UE platform, operating system, and applications, and data utilized by the platform, operating system, and applications.

In various examples, the processor(s) 608 can be a central processing unit (CPU), a graphics processing unit (GPU), or both CPU and GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing all computer applications stored in the memory 602, which can be associated with common types of volatile (RAM) and/or nonvolatile (ROM) memory.

The radio interfaces 610 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 610 can be compatible with multiple radio access technologies, such as 5G radio access technologies and 4G/LTE radio access technologies. Accordingly, the radio interfaces 610 can allow the UE 112 to connect to the 5G system 102 described herein.

The display 612 can be a liquid crystal display or any other type of display commonly used in UEs 112. For example, display 612 may be a touch-sensitive display screen, and can then also act as an input device or keypad, such as for providing a soft-key keyboard, navigation buttons, or any other type of input. The output devices 614 can include any sort of output devices known in the art, such as the display 612, speakers, a vibrating mechanism, and/or a tactile feedback mechanism. Output devices 614 can also include ports for one or more peripheral devices, such as headphones, peripheral speakers, and/or a peripheral display. The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 608, and/or radio interface(s) 610 during execution thereof by the UE 112. The memory 602 and the processor(s) 608 also can constitute machine readable media 618.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
    configuring, by a server of a network, a message indicating a test location and a test condition associated with the network;
    sending, by the server, the message to test modules included in autonomous vehicles, user equipment (UEs), and unmanned aerial vehicles (UAVs), the test modules configured to:
        receive network data associated with one or more UEs, base stations (BSs), and navigation components included in the autonomous vehicles, UEs, and UAVs; and
        determine a capability of the network at the test location in accordance with the test condition based at least in part on the network data;
    sending, by the server, the test location to the navigation components of the autonomous vehicles, UEs, and UAVs;
    causing, by the server, those of the autonomous vehicles, UEs, and UAVs not at the test location to navigate to the test location;
    receiving, by the server, test data from the test modules indicating one or more capabilities of the network at the test location;
    associating, by the server, metadata with the test data from the test modules;
    storing the test data and the metadata in a database; and
    determining, by the server and based at least in part on using the metadata to access the test data from the database, network parameters associated with peak throughput for the one or more UEs accessing the network,
    wherein the network is a fifth generation (5G) network and the message is associated with multiple user multi-input multi-output (MU-MIMO) testing in the 5G network, and
    wherein the network parameters comprising one or more of: a signal strength, a beam Precoding Matrix Indicator (PMI) number, a frequency, a power, or a signal-to-noise ratio to transmit data between the one or more UEs and the network.

2. The method of claim 1, wherein the test data is first test data and the test modules include a first test module, and further comprising:
    receiving, by the server, second test data from a second test module indicating one or more capabilities of the network at a second test location; and
    determining, by the server and based at least in part on the first test data and the second test data, the network parameters.

3. The method of claim 1, wherein the message indicates multiple test locations and multiple test conditions associated with testing at least one of: a Time Division Duplex (TDD) system, a Frequency Division Duplex (FDD) system, a UAV system, or a Vehicle to Everything (V2X) system.

4. The method of claim 1, further comprising:
    identifying interference between one or more UAVs and a base station; and
    based at least in part on identifying the interference, at least one of:
        mitigating interference between the one or more UAVs and the base station;
        mitigating noise rise associated with the one or more UEs and the base station; or
        causing the one or more UAVs or UEs to be inoperable.

5. The method of claim 1, further comprising:
    determining, by the server, a first test and a second test different from the first test;
    ranking, by the server, the first test relative to the second test based at least in part on a comparison between a first location associated with the first test and a second location associated with the second test; and
    sending an indication of the ranking to the navigation components to cause navigation to the first location and the second location in accordance with the ranking.

6. The method of claim 1, wherein:
    the test condition indicates to perform at least one of: an upload test, a download test, a combined upload and download test, a latency test, a jitter test, a packet rate test, a voice quality test, a video quality test, a backhaul test, or a handover test; and
    the one or more capabilities of the network indicated by the test data comprises one or more of: downlink and uplink throughputs, latency, volume of data, time/location, amount of call attempts, accepts, failures, amount of handovers, mean-opinion-score (MOS), signal to interference plus noise ratio (SINR), modulation and coding scheme (MCS), signal strength, UE transmit power, cell site number, or a frequency.

7. A system comprising:
    one or more processors; and
    memory storing computer-executable instructions that, when executed by the one or more processors, cause the system to perform operations comprising:
        configuring, by a server of a network, a message indicating a test location and a test condition associated with the network;
        sending, by the server, the message to test modules included in autonomous vehicles, user equipment (UEs), and unmanned aerial vehicles (UAVs), the test modules configured to:
            receive network data associated with one or more UEs, base stations (BSs), and navigation components included in the autonomous vehicles, UEs, and UAVs; and determine a capability of the network at the test location in accordance with the test condition based at least in part on the network data;

sending, by the server, the test location to the navigation components of the autonomous vehicles, UEs, and UAVs;

causing, by the server, those of the autonomous vehicles, UEs, and UAVs not at the test location to navigate to the test location;

receiving, by the server, test data from the test modules indicating one or more capabilities of the network at the test location;

associating, by the server, metadata with the test data from the test modules;

storing the test data and the metadata in a database; and determining, by the server and based at least in part on using the metadata to access the test data from the database, network parameters associated with peak throughput for the one or more UEs accessing the network, wherein the message is associated with testing separation between two base stations and determining the network parameters further comprises determining a frequency guard band between the two base stations, and wherein the network is a fifth generation (5G) network and the message is associated with multiple user multi-input multi-output (MU-MIMO) testing in the 5G network.

8. The system of claim 7, wherein the one or more UEs include a plurality of UEs, and the operations further comprise causing the network to communicate with multiple ones of the one or more UEs at a same time based at least in part on the test data.

9. The system of claim 7, wherein:
determining the network parameters further comprises determining a horizontal distance or a vertical distance between the two base stations.

10. The system of claim 7, the operations further comprising configuring the message based at least in part on an occurrence of one or more events, the one or more events comprising a drop call rate, a change in noise, or a predetermined throughput value.

11. The system of claim 7, the operations further comprising:
receiving network data from a remote sensor; and
configuring the message based at least in part on the network data from the remote sensor meeting or exceeding a testing threshold.

12. The system of claim 7, wherein:
the navigation components include a navigation device or a Vehicle to Everything (V2X) device; and
wherein the metadata indicates an upload time or a test time of the test data.

13. The system of claim 7, the operations further comprising:
determining one or more of: a bandwidth, a Time Division Duplex (TDD) ratio configuration, a frequency channel, a transmission power, a beamforming Precoding Matrix Indicator (PMI), or a distance between two test modules to provide peak throughput for the one or more UEs accessing the network.

14. The system of claim 7, the operations further comprising identifying, based at least in part on the test data, a Time Division Duplex (TDD) ratio configuration that enables a first operator and a second operator to communicate simultaneously in a TDD system.

15. The system of claim 7, the operations further comprising:
receiving an indication to test the network; and
sending, by the server, the message to the test modules based at least in part on the indication to test the network.

16. A non-transitory computer storage medium having programming instructions stored thereon that, when executed by a processor of a computing device, cause the computing device to perform operations comprising:
configuring, by a server of a network, a message indicating a test location and a test condition associated with the network;
sending, by the server, the message to test modules included in autonomous vehicles, user equipment (UEs), and unmanned aerial vehicles (UAVs), the test modules configured to:
receive network data associated with one or more UEs, base stations (BSs), and navigation components included in the autonomous vehicles, UEs, and UAVs; and
determine a capability of the network at the test location in accordance with the test condition based at least in part on the network data;
sending, by the server, the test location to the navigation components of the autonomous vehicles, UEs, and UAVs;
causing, by the server, those of the autonomous vehicles, UEs, and UAVs not at the test location to navigate to the test location;
receiving, by the server, test data from the test modules indicating one or more capabilities of the network at the test location;
associating, by the server, metadata with the test data from the test modules;
storing the test data and the metadata in a database; and
determining, by the server and based at least in part on using the metadata to access the test data from the database, network parameters associated with peak throughput for the one or more UEs accessing the network,
wherein the network is a fifth generation (5G) network and the message is associated with multiple user multi-input multi-output (MU-MIMO) testing in the 5G network, and
wherein the network parameters comprising one or more of: a signal strength, a beam Precoding Matrix Indicator (PMI) number, a frequency, a power, or a signal-to-noise ratio to transmit data between the one or more UEs and the network.

17. The non-transitory computer storage medium of claim 16, wherein the one or more UEs include a plurality of UEs, and the operations further comprise causing the network to communicate with multiple ones of the one or more UEs at a same time based at least in part on the test data.

18. The non-transitory computer storage medium of claim 16, wherein:
the message is associated with testing separation between two base stations; and determining the network parameters further comprises determining a horizontal distance or a vertical distance between the two base stations and determining a frequency guard band between the two base stations.

19. The non-transitory computer storage medium of claim 16, wherein the operations further comprise:
identifying interference between one or more UAVs and a base station; and based at least in part on identifying the interference, at least one of:
  mitigating interference between the one or more UAVs and the base station;
  mitigating noise rise associated with the one or more UEs and the base station; or
  causing the one or more UAVs or UEs to be inoperable.

* * * * *